United States Patent [19]

Chen et al.

[11] Patent Number: 5,220,269

[45] Date of Patent: Jun. 15, 1993

[54] POWER SUPPLY UNIT

[75] Inventors: Ieon C. Chen, Laguna Hills; Michael Wilson, Mission Viejo, both of Calif.

[73] Assignee: Innova Electronics Corporation, Fountain Valley, Calif.

[21] Appl. No.: 771,684

[22] Filed: Oct. 4, 1991

[51] Int. Cl.[5] ............................. A45F 5/00; H02J 7/00
[52] U.S. Cl. ........................................ 320/2; 224/902; 307/150
[58] Field of Search ........................... 320/2; 224/902; 307/150

[56] References Cited

U.S. PATENT DOCUMENTS

| | | | |
|---|---|---|---|
| 1,984,398 | 12/1934 | Dame | 429/97 X |
| 2,978,596 | 4/1961 | Robirds | 320/2 X |
| 3,919,615 | 11/1975 | Niecke | 320/2 |
| 3,963,972 | 6/1976 | Todd | 320/2 |

OTHER PUBLICATIONS

Radio Shack Catalog—1990 p. 10-"Cellular Telephone CT-201".

Primary Examiner—R. J. Hickey
Attorney, Agent, or Firm—Stetina and Brunda

[57] ABSTRACT

A portable, handheld power supply unit is disclosed for electrically powering a variety of interconnectable accessory devices. The unit comprises a power supply body having a battery disposed therein. The body is provided with a bracket disposed on the body side portion for engaging and supporting accessory devices. The side bracket is provided with electrical contacts formed therein for communicating power between the battery and an accessory device supported by the bracket. A recharging plug connected to the internal battery is stowable within a handle portion and extendable to connect the battery to an external charging circuit. An output socket is also disposed on the body and serves as an alternate port for communicating power from the body to external accessory devices.

7 Claims, 2 Drawing Sheets

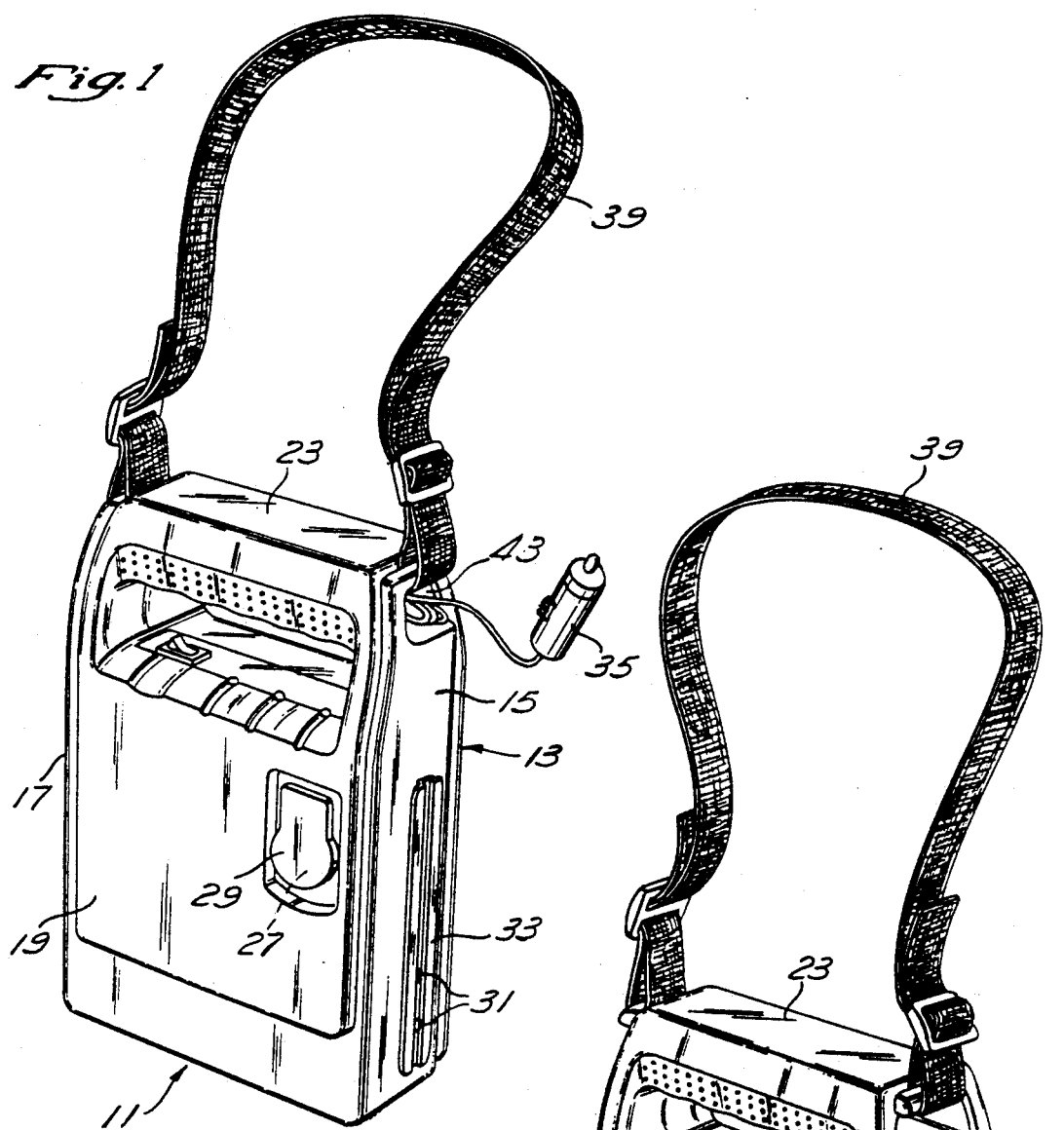

POWER SUPPLY UNIT

FIELD OF THE INVENTION

The present invention relates to a power supply unit and, more particularly to a portable handheld power supply that is useful to supply power to a variety of different components connectable to the unit.

BACKGROUND OF THE INVENTION

A variety of different portable power supplies are presently available. Such power supplies are typically configured to have an output jack for interconnection to the unit to be powered, e.g. a light or video equipment. Though such devices provide an adequate power source, they do not integrate the functions of the power source and the product being powered. Thus, the user must carry a power source separate and apart from the various devices to be powered. This is clearly cumbersome and inconvenient. Moreover, it is not uncommon that the configuration of the power supply output jack is inconsistent with the input jack of the device being powered. Consequently, a variety of different adaptors are frequently necessary in order to effectively interconnect the power supply and the device being powered.

The present invention is intended to address these and other deficiencies commonly found in portable power supplies, resulting in a product that is not only electrically functional to power a variety of different devices, but which is also convenient and practical to use.

SUMMARY OF THE INVENTION

A portable, handheld power supply unit is disclosed for electrically powering a variety of interconnectable accessory devices. The unit comprises a power supply body having a battery disposed therein. The body is provided with a bracket disposed on the body side portion for engaging and supporting accessory devices. The side bracket is provided with electrical contacts formed therein for communicating power between the battery and an accessory device supported by the bracket. A recharging plug connected to the internal battery is stowable within a handle portion and extendable to connect the battery to an external charging circuit. An output socket is also disposed on the body and serves as an alternate port for communicating power from the body to external accessory devices.

In the presently preferred embodiment the power supply unit is provided with a pair of brackets, one on each side portion, for receiving and supporting accessory devices. A first bracket is provided with electrical contacts to power the interconnected accessory device. The second bracket serves only to support an accessory device. Other than the absence of electrical contacts on the second bracket, both the first and second brackets have substantially the same construction.

BRIEF DESCRIPTION OF THE DRAWINGS

FIG. 1 is a front perspective view of a portable power supply formed in accordance with the present invention;

FIG. 2 is a rear perspective view of the power supply shown in FIG. 1;

DETAILED DESCRIPTION OF THE PREFERRED EMBODIMENT

Figure 4:
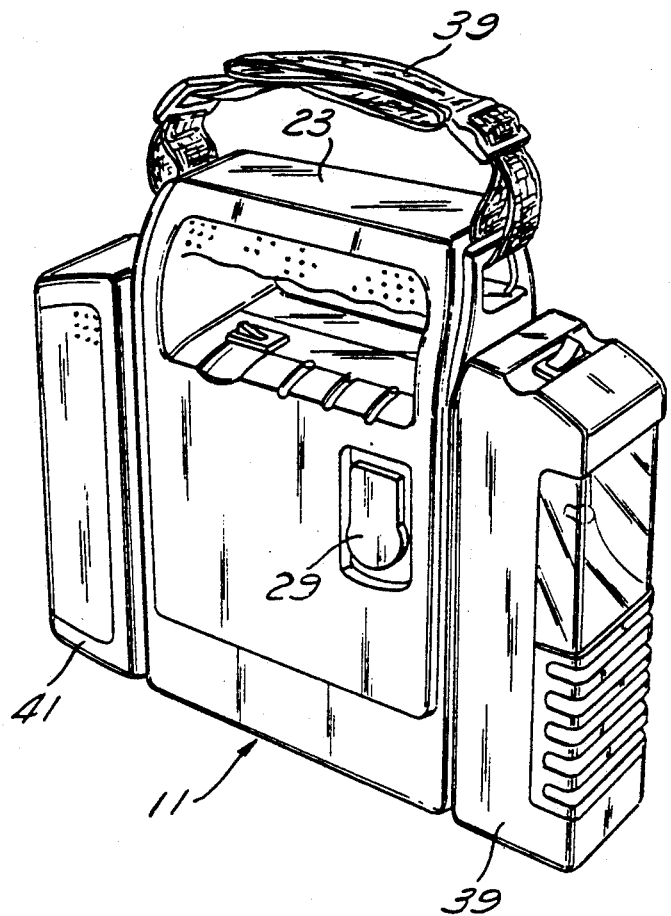
FIG. 4 is a front perspective view of the invention showing interconnected components.

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

FIGS. 1 and 2 are perspective views of a power supply 11 formed in accordance with the invention, with the charging plug in a stowed configuration and without any interconnected devices. As shown therein the portable power supply 11 includes a body 13 having side portions 15, 17, front portion 19, rear portion 21 and handle portion 23. A rechargeable internal battery, such a sealed lead-acid rechargeable battery is disposed within the housing 13 and is typically operative to generate a 12-volt DC output. The output from the power supply 11 may be communicated via an output socket disposed beneath socket cover 29, or alternatively by means of output contact 31 formed within modular side bracket 33. The power supply 11 is preferably also provided with an adjustable shoulder strap 39 to facilitate carrying the power pack 11.

Input power to charge the power supply 11 may be provided by plug 35 disposable within aperture 43 formed in handle portion 23. The plug 35 is connectable to a vehicle cigarette lighter socket. The plug 35 may alternatively be connectable to an AC adaptor, e.g. a 1000 mA AC adaptor. The power supply 11 may also be rechargeable from a solar power source connectable to the output socket 27. In the presently preferred embodiment the power supply 11 is provided with on/off switch 39, system ready indicator 41, recharging indicator 43 and low battery and charge fuse indicator 45. However, it should be understood that various of the indicator circuits and displays can be eliminated, modified or supplemented without departing from the broader aspects of the invention.

FIG. 2 illustrates modular side bracket 37 disposed on side portion 17 of the power supply 11. In the presently preferred embodiment one of the side brackets 33, 37 is provided with a DC output contacts and the other side bracket has no electrical contact. Consequently, one of the side brackets may be used to support and carry a component, while the other also serves to provide power to the connected component. It will be recognized, however, that contacts may be provided in both side brackets, if desired. A channel 43 is formed intermediate the side bracket 37. The channel 43 extends vertically along the length of the side portion 17, intermediate the side portion 17 and bracket 37. The channel 43 is useful to receive and engage mating brackets on accessory devices to hold the accessory devices in place, opposing perpendicular movement of the accessory devices from the power supply unit 11.

Figure 3:
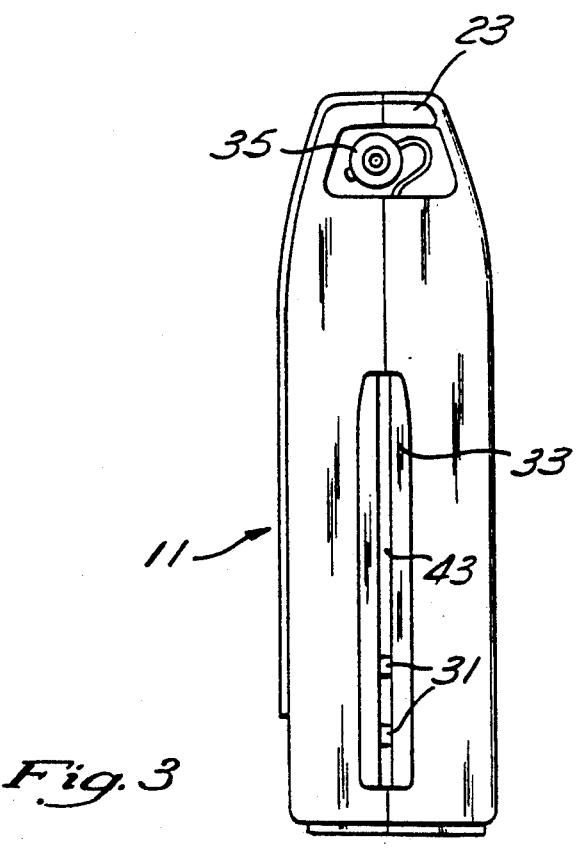
FIG. 3 is a side view of the power supply shown at FIG. 1.

As illustrated at FIG. 3 the recharging plug 35 may be stowed within the handle portion 23 thus permitting convenient storage and deployment while and avoiding the need for separate connection of the recharging plug. FIG. 3 also illustrates the output contacts 31 formed within side bracket 33. As accessory devices engage bracket 33 they also make electrical contact with contacts 31 thereby communicating power from the power supply 11 to the accessory device.

FIG. 4 illustrates the power supply 11 interconnected to a fluorescent lantern 39 and rechargeable battery 41. As previously indicated the fluorescent lantern 39 is electrically connected to and supported by the power supply 11 via a modular side bracket 33. Rechargeable battery 41 is supported by the power supply 11 via modular side bracket 37. In the illustrated embodiment only the modular side bracket 33 incorporates an electrical connection to the power supply internal battery, and therefore only the fluorescent lantern 39 is connected to the internal battery in this configuration. However, it should be clear that the position of fluorescent lantern 39 and rechargeable battery 41 can readily be switched in order to provide available power to the rechargeable battery 41.

As will be recognized by those skilled in the art, the internal circuitry of the power supply 11 may be selected and varied as convenient without departing from the broader aspects of the invention. Additionally, it should also be understood that the power supply 11 may be used in conjunction with a variety of different accessory devices in addition to the illustrated device, i.e. fluorescent lantern 39 and rechargeable battery 41. As presently contemplated the power supply 11 may also be used in connection with various devices such as an emergency flashlight, first-aid kit, multi-purpose container, fluorescent lantern, radio, siren, emergency radio, other devices. Moreover, the power supply 11 may be connected by wire, via output socket 27, to a large number of additional devices such as a portable television, CB radio, air compressor, vacuum cleaner, hand drill or other devices.

What is claimed is:

1. A portable, handheld power supply unit for electrically powering a variety of interconnectable accessory devices, comprising:

a power supply body having a battery disposed therein, the body further having first and second side portions, a front portion, a rear portion and a handle portion;

a first bracket disposed on the body first side portion for engaging and supporting a first accessory devices, said first bracket having electrical contacts formed therein for communicating power between the battery and the first accessory device;

said bracket forming a longitudinal channel extending along said body first side portion for opposing movement of the first accessory device from the power supply body other than along the longitudinal channel;

a recharging plug stowable within the handle portion, said recharging plug being operative to communicate power between an external charging circuit and the battery; and an output socket disposed on the body front portion for communicating power from the battery to an external accessory device.

2. The power supply unit as recited in claim 1 further comprising a second bracket disposed on the body second side portion for receiving and engaging a second accessory device.

3. The power supply unit as recited in claim 2 wherein said first and second brackets have substantially the same construction.

4. The power supply unit as recited in claim 1 further comprising an output socket disposed on the body front portion, said output socket being operative to communicate power between the battery and an accessory device.

5. The power supply unit as recited in claim 1 wherein the first bracket extends vertically along said body first side portion.

6. The power supply unit as recited in claim 5 wherein the longitudinal channel extends vertically along said body first side portion.

7. The power supply unit as recited in claim 1 wherein said channel is formed intermediate said body first side portion and the first bracket.

* * * * *